Sept. 7, 1965    J. K. MILLS    3,205,426
REGULATED POWER SUPPLY
Filed June 27, 1962    2 Sheets-Sheet 1

INVENTOR
J. K. MILLS
BY
ATTORNEY

Sept. 7, 1965

J. K. MILLS 3,205,426

REGULATED POWER SUPPLY

Filed June 27, 1962

INVENTOR
J. K. MILLS
BY
ATTORNEY

United States Patent Office 3,205,426
Patented Sept. 7, 1965

3,205,426
REGULATED POWER SUPPLY
John K. Mills, Morristown, N.J., assignor to Bell Telephone Laboratories, Incorporated, New York, N.Y., a corporation of New York
Filed June 27, 1962, Ser. No. 205,776
3 Claims. (Cl. 321—18)

This invention relates to power supply circuits and, more particularly, to a high power capacity, regulated power supply employing controller rectifiers to achieve regulation.

One frequently used technique to regulate power supplies which convert alternating-current power to direct-current power involves the use of controlled rectifiers, e.g., thyratrons and pnpn triode transistors, both to rectify alternating-current and to control the quantity of power converted. The unilateral conduction characteristic of a controlled rectifier, usually bistable, is determined by the signal applied to its control electrode. Regulation is accomplished according to the technique by a feedback control loop from the direct-current output of the power supply to the control electrode of the controlled rectifier, thus controlling the portion or angle of each cycle of the alternating-current power during which the controlled rectifier conducts. In such a scheme when a small quantity of direct-current power is called for, the controlled rectifier is rendered conductive during small intervals of each cycle. Conversely, the controlled rectifier operates at large conduction angles when a large quantity of direct-current power is required at the power supply output to maintain regulation.

In the design of power supplies utilizing controlled rectifiers, the current and reverse voltage ratings of the controlled rectifier is always a major concern, imposing a limitation on the power handling capability of the power supply. It has been a general practice in designing power supply circuits employing controlled rectifiers to follow old power supply designs, simply substituting one or more controlled rectifiers for some of the ordinary rectifiers. As a result, all of the rectified power passes through the controlled rectifiers. In the early stages of development of any particular type of electronic device, and the controlled rectifier is no exception, the ratings of commercially available devices are low. As the technology of the device advances, devices having sufficiently large ratings to satisfy most applications eventually become available, but the cost of the device is still related to its rating.

An obvious solution to overcoming the restrictions imposed upon power supply capacity by the ratings of the controlled rectifiers used is to substitute several controlled rectifiers connected in parallel for each single controlled rectifier. This does not prove a very satisfactory answer for commercial applications, however, because the various parallel branches must have matched transmission characteristics or the distribution of power among the controlled rectifiers will be unequal. Moreover, the disparity in distribution of power among the branches is often compounded by a regenerative condition brought on by device heating.

In most power supplies utilizing controlled rectifiers current flows only during the intervals in which the controlled rectifiers conduct. Consequently, for some conduction angles the power factor that the power supply presents to the alternating-current source is unduly small. Inefficient use of the available alternating-current power is the result.

Patent No. 2,642,558 issued June 16, 1953, to V. J. Terry et al. discloses a power supply whose direct-current output is provided by the sum of a continuous unregulated current component not passing through controlled rectifiers and an intermittent regulated current component that passes through controlled rectifiers. Thus, the capacity of such a power supply is expandable far beyond the ratings of the controlled rectifiers and a better power factor results because the current delivery to the power supply is distributed throughout the entire cycle. A good deal of circuitry, particularly transformers, not necessary in conventional power supplies is required to implement the Terry et al. power supply, all of which contributes to the size, weight, and cost of the resultant power supply.

It is, therefore, the object of the present invention to extend the power handling capabilities of simple power supplies utilizing controlled rectifiers for regulation beyond the ratings of the controlled rectifiers and to improve the power factor presented by such a power supply.

In accordance with the above object a power supply is provided in which power of a predetermined value from an alternating-current power source is applied to a first rectifying circuit that is connected to a direct-current output circuit. A second rectifying circuit to which is supplied power of a different predetermined value from the alternating-current source is substituted for the first rectifying circuit from time to time to furnish an alternative path between the alternating-current source and direct-current output circuit. Regulation of the power appearing at the direct-current output circuit is accomplished by controlling the duration of the substitutions.

More specifically, the above scheme can be implemented by connecting between a secondary winding of a transformer and a direct-current output circuit to operate as the first rectifying circuit, a full wave, center tap rectifier with a redundant diode poled between the center tap and output circuit in the direction to conduct rectified current. The alternating-current source is coupled to the primary winding of the transformer. The second rectifying circuit takes the form of a full wave, controlled rectifier bridge connected between the end terminals of the secondary winding and the direct-current output circuit. When the controlled rectifier is not conducting the second rectifying circuit is inoperative and the full wave, center tap rectifier delivers power from one-half of the secondary winding to the direct-current output. Upon actuation of the controlled rectifier into conduction, the redundant diode connected to the center tap becomes reverse biased bringing about a substitution of the full wave bridge rectifier for the full wave center tap rectifier. The power delivered to the output circuit in this state is that available across the full secondary winding.

According to another feature of the invention, the relative proportion between the power contributed to the output circuit by the first and second rectifier circuits may be changed by employing two redundant diodes connected to the secondary winding on opposite sides of the center point and poled to conduct current between the secondary winding and output circuit in the direction of rectified current.

The above and other features of the invention will be described in detail in the following specification taken in conjunction with the drawings in which.

Figure 1:
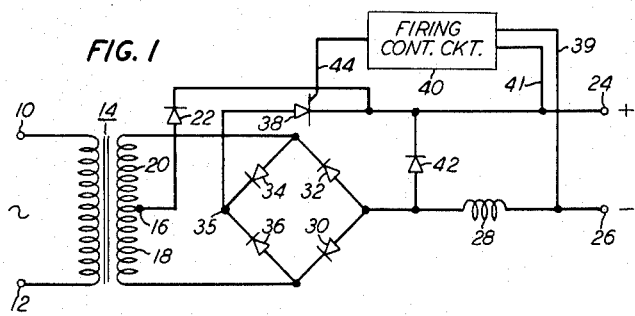
FIG. 1 is a circuit schematic of a power supply illustrating the principles of the invention.

Reference now is made to the drawings, throughout which corresponding elements are labeled consistently. In FIG. 1 alternating-current power, available at terminals 10 and 12, is applied to the primary winding of a transformer 14. The secondary winding of transformer 14 is provided with a center tap 16 dividing identical sections 18 and 20. Alternating-current power supplied at terminals 10 and 12 is rectified and delivered to direct-current output terminals 24 and 26 through two rectifying circuits which are operative on an alternate basis. The first rectifying circuit is a standard full wave, center tap rectifier having an additional or redundant diode 22 poled for conduction from center tap 16 to output terminal 24. Diodes 30 and 32, poled for conduction from terminal 26 to the end terminals of sections 18 and 20, respectively, comprise the legs of this rectifying circuit. When the end terminal of section 20 is positive in potential with respect to the end terminal of section 18, current flows from section 18 at center tap 16 through diode 22 to output terminal 24. After passage through the load (not shown but connected between terminals 24 and 26) current returns from terminal 26 to section 18 through a filter inductor 28, used to smooth the ripple of the direct-current output and diode 30. Conversely, current flows from section 20 through diode 22 to output terminal 24 and returns from output terminal 26 to section 20 through diode 32 when the end terminal of section 18 becomes more positive in potential than the end terminal of section 20. During each full cycle, alternating-current power is transferred across one-half of the secondary winding of transformer 14, i.e., section 18 or 20 on alternate half cycles, and is delivered by the first rectifying circuit to output terminals 24 and 26.

The second rectifying circuit is a standard full wave, bridge rectifier formed by diodes 34 and 36, poled for conduction from the end terminals of sections 20 and 18, respectively, to a junction point 35, and diodes 30 and 32. A controlled rectifier 38 connected between junction point 35 and output terminal 24, when actuated into conduction, renders the full wave, bridge rectifier operative. When this occurs, power across the complete secondary of transformer 14 is delivered to terminals 24 and 26 through the bridge rectifier. At the same time, the full wave, center tap rectifier is rendered inoperative due to a virtual open circuit occurring between center tap 16 and output terminal 24 resulting from back-biasing of diode 22. During half cycles in which the end terminal of section 20 is positive in potential with respect to the end terminal of section 18, current flows tot output terminal 24 through diode 34 and controlled rectifier 38. Concurrently, essentially the entire voltage appearing across section 20 is impressed across diode 22 in the reverse direction. Current returns to section 18 from output terminal 26 via diode 30. During half cycles in which the end terminal of section 18 is of positive potential with respect to the end terminal of section 20, current flows to output terminal 24 through diode 36 and controlled rectifier 38. At the same time, essentially the entire voltage appearing across section 18 is impressed across diode 22 in the reverse direction. Current on this half cycle returns to section 20 from output terminal 26 through diode 32.

A portion of the voltage appearing across output terminals 24 and 26 is applied by leads 41 and 39 to a firing control circuit 40 that develops a control signal for application to a control electrode 44 of controlled rectifier 38. The control signal governs the conduction angle of controlled rectifier 38 and thus achieves voltage regulation of the output signal. Current regulation could alternatively be achieved by other well-known techniques. Whatever type of regulation is practiced, when an increase in power across output terminals 24 and 26 is required, the conduction angle of controlled rectifier 38 is increased and the bridge rectifier provides power to terminals 24 and 26 during a larger portion of each alternating-current cycle. Conversely, when a reduction in power at output terminals 24 and 26 is called for by the conditions thereat, the conduction angle of controlled rectifier 38 is decreased under the control of firing control circuit 40. Firing control circuit 40 may, by way of example, be the type of circuit disclosed in FIG. 10.1, at page 171 of the General Electric Silicon Controlled Rectifier Manual, second edition, 1961.

Filter inductor 28 opposes changes in current passing through it, and through the load. During intervals of each cycle in which the full wave, center tap rectifying circuit is operative, power stored in inductor 28 discharges power to the load through a "flyback" diode 42 to compensate for the reduction in current supplied by the center tap rectifier from that supplied by the bridge rectifier. Absent flyback diode 42, inductor 28 would generate large opposing voltages that are a potential source of injury to the circuit components, particularly to controlled rectifier 38.

Figure 2:
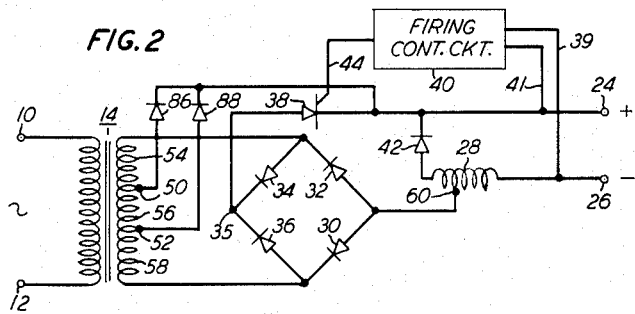
FIG. 2 is a circuit schematic modification of the power supply shown in FIG. 1.

FIG. 2 discloses a circuit modification of the power supply in FIG. 1 which exhibits advantages for some applications. Here the secondary circuit of transformer 14 is composed of three sections 54, 56, and 58 separated by intermediate taps 50 and 52 which can, but need not, be symmetrically disposed about the middle of the secondary winding. Diodes 86 and 88, replacing diode 22 in FIG. 1, are poled to conduct current from taps 50 and 52, respectively, to output terminal 24. When controlled rectifier 38 is not conducting and the end terminal of section 54 is of poistive potential with respect to the end terminal of section 58, power is conveyed across transformer 14 to sections 56 and 58 and to output terminals 24 and 26 through diode 86. At the same time, essentially the entire voltage appearing across the section 56 back-biases diode 88. During intervals in which controlled rectifier 38 is not conducting and the end terminal of section 58 is positive in potential with respect to the end terminal of section 54, the roles of diodes 86 and 88 are reversed. In this case diode 88 provides a path for power transfer from sections 54 and 56 to output terminals 24 and 26 and diode 86 is back-biased. As in the operation of the circuit of FIG. 1, operation of controlled rectifier 38 causes back bias of diodes 86 and 88. The described arrangement results in a larger proportion of the potential power available across the complete secondary winding of transformer 14 to be delivered to output terminals 24 and 26 when controlled rectifier 38 is not conducting than is possible in the arrangement of FIG. 1. Consequently, a more favorable power factor is attainable with the modification of FIG. 2. A possible disadvantage for some applications is that the range of values of direct-current power over which the output is capable of being regulated is curtailed.

A second modification in the circuit of FIG. 2, resides in the connection of diodes 30 and 32 to an intermediate tap 60 on inductor 28 located a small distance from the end terminal of inductor 28 which is connected to flyback diode 42. This arrangement makes feasible operation of the circuits in FIGS. 1 and 2 from either a square wave or high frequency, alternating-current source. To properly operate a controlled rectifier from a square wave or high frequency, alternating-current source, it is found useful to accelerate the return of the controlled rectifier to its nonconducting state at the end of each half cycle by imposing a negative bias on it. Flyback diode 42 conducts current at the end of each half cycle, developing a voltage across the segment of inductor 28 between tap 60 and the end terminal connected to flyback diode 42 that imposes the desired negative bias on controlled rectifier 38.

Figure 3:
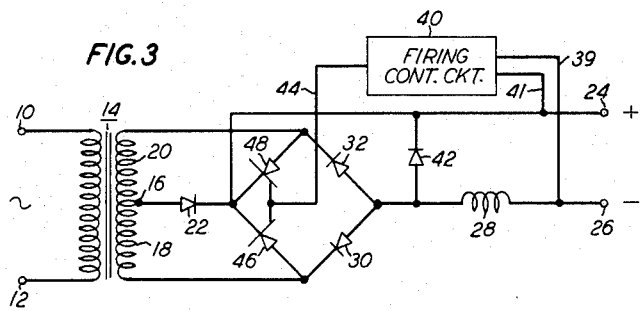
FIG. 3 is a circuit schematic of a conventional power supply modified in accordance with the invention.

FIG. 3 illustrates the modification in accordance with the invention of a well-known controlled rectifier power supply circuit. The circuit arrangement of FIG. 3, except for redundant diode 22 is disclosed in FIG. 4.8 on page 40 of the General Electric Silicon Controlled Rectifier Manual, second edition, 1961. The bridge rectifier, composed of controlled rectifiers 46 and 48 and diodes 30 and 32, passes power to output terminals 24 and 26 only during intervals of each cycle in which controlled rectifiers 46 and 48 conduct. During such intervals, as described in connection with FIG. 1, diode 22 is back-biased. During intervals of each cycle in which controlled rectifiers 46 and 48 are not operative, also as described in connection with FIG. 1, diode 22 is conductive and completes a full wave, center tap rectifier circuit that delivers power to output terminals 24 and 26. As a result of the insertion of diode 22, somewhat less than the entire power delivered to output terminals 24 and 26 passes through controlled rectifiers 46 and 48 and the power factor is improved.

Figure 4:
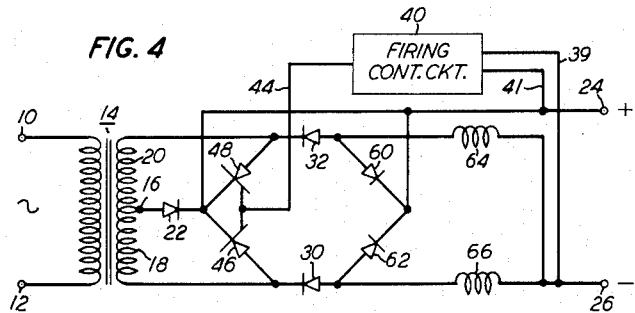
FIG. 4 is a circuit schematic of still another power supply embodying the invention.

In FIG. 4 still another power supply circuit, this one disclosed and claimed in a patent application of J. W. Rieke, Serial No. 205,793, filed on even date with and assigned to the assignee of the instant application, is modified according to the invention by the use of diode 22. The Rieke circuit is a bridge rectifier having arms comprising controlled rectifier 46, controlled rectifier 48, diode 30 connected in series with an inductor 66, and diode 32 connected in series with an inductor 64. Flyback diodes 60 and 62 provide discharge paths from inductors 64 and 66, respectively, to output terminals 24 and 26. During intervals in which controlled rectifiers 46 and 48 are not conducting when the end terminal of section 20 is positive in potential with respect to the end terminal of section 18, current flows from section 18 through diode 22 to the load (not shown) and returns through inductor 66 and diode 30 to section 18. At the same time, power stored in inductor 64 during half cycles of the opposite polarity is delivered to the load by way of flyback diode 60. When the end terminal of section 18 is positive in potential with respect to the end terminal of section 20, current flows from section 20 through diode 22 to the load and returns to section 20 through inductor 64 and diode 32. In this case, power stored in inductor 66 during half cycles of the opposite polarity is delivered to the load through flyback diode 62. Upon actuation into conduction of controlled rectifiers 46 and 48, diode 22 becomes back-biased and the full wave rectifying bridge composed of controlled rectifiers 46 and 48 and diodes 30 and 32 delivers power to output terminals 24 and 26. Inductors 64 and 66 function alternately as before to supply additional current to the load. The insertion of diode 22 in the Rieke power supply, as in the power supply of FIG. 3, makes improved power factors possible.

Figure 5:
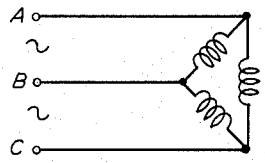
FIG. 5 is a circuit schematic of a three-phase adaptation of the circuit disclosed in FIG. 1.
Figure 5:
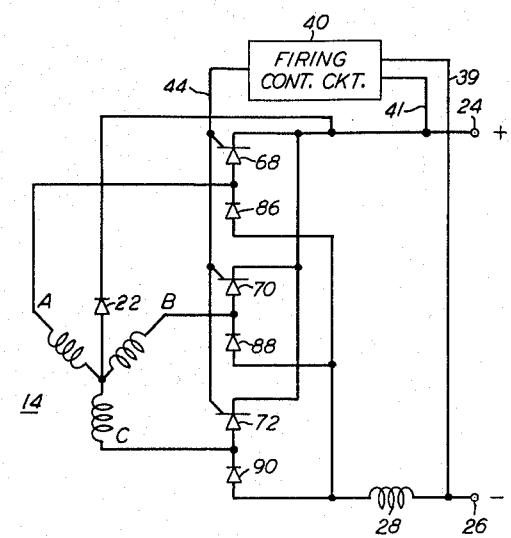

FIG. 5 discloses an extension of the circuit of FIG. 1 to provide a three-phase power supply. Three-phase power is applied to the Δ-connected primary windings of transformer 14 from terminals A, B, and C, respectively. Controlled rectifiers 68, 70, and 72 interconnect the Y-connected secondary windings of transformer 14 to output terminal 24 and diodes 86, 88, and 90 interconnect these secondary windings to output terminal 26. When controlled rectifiers 68, 70, and 72 are not conducting diode 22 delivers power to terminals 24 and 26. Upon the actuation of the controlled rectifiers into conduction, half bridge rectifiers 68, 70, and 72 take over, delivering more power to output terminals 24 and 26, and diode 22 becomes back-biased.

Figure 6:
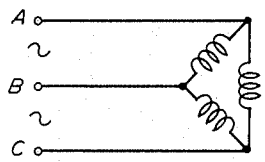
FIG. 6 is a circuit schematic which represents the three-phase equivalent of the circuit shown in FIG. 4.
Figure 6:
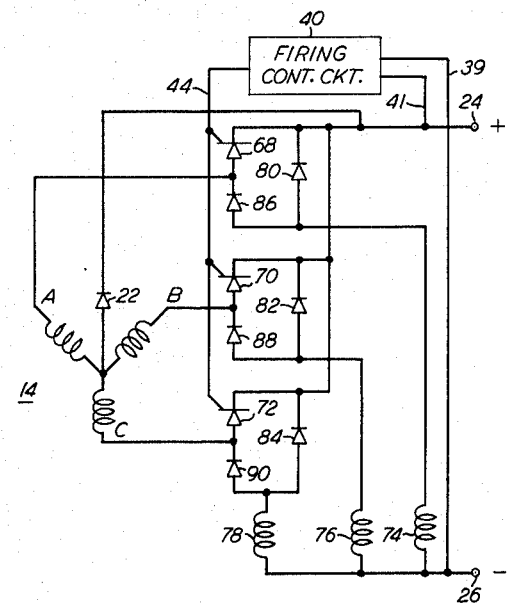

In FIG. 6 an adaptation of the circuit disclosed in FIG. 4 for three-phase power is shown. Three-phase power is applied to terminals A, B, and C, respectively, of the Δ-connected primary windings of transformer 14. Connected in series with diodes 86, 88, and 90 between output terminal 26 and the secondary windings of transformer 14 are inductors 74, 76, and 78, respectively. Connected in series with inductors 74, 76, and 78 between output terminals 24 and 26 are flyback diodes 80, 82, and 84, respectively. This circuit functions substantially as described above in connection with FIG. 4. Diode 22 connects the junction of the Y-connected secondary windings of transformer 14 to output terminal 24, and completes a current path to the load (not shown) when the controlled rectifiers are not conducting. Operation of the controlled rectifiers back-bias diode 22 and increases the power flow to the load. Added current is supplied to the load through one or more of inductors 74, 76, and 78 and the respective flyback diodes 80, 82, and 84.

What is claimed is:

1. A power supply comprising an alternating-current source of power having first and second terminals and third and fourth terminals at potentials intermediate to the potentials at said first and second terminals, an output circuit, a bridge rectifier circuit having four diode legs and connected between said first and second terminals and said output circuit, said bridge rectifier being conductive only during a part of the cycle of the alternating-current signal, which part is dependent upon the conditions at said output circuit, and diodes connected from said third and fourth terminals to said output circuit, said diodes being poled to conduct current through said output circuit in the same direction as said bridge rectifier.

2. An electrical circuit comprising a source of alternating-current power, positive and negative output terminals, a rectifier circuit interconnecting said source and said output terminals, said rectifier circuit including a controlled rectifier to control conduction from said source to said output terminals, an inductor having first and second portions with a common terminal, said first portion of said inductor connected in series between said rectifier circuit and one of said output terminals, said common terminal being connected to said rectifier, and a diode and said second portion of said inductor being connected in series between said rectifier and the other of said output terminals, said diode poled to carry current to said positive output terminal.

3. A power supply comprising a source of alternating-current power having first and second terminals and third and fourth terminals at potentials intermediate to the potentials at said first and second terminals, positive and negative output terminals, a full wave bridge rectifier having four unilaterally conducting legs connected between said first and said second terminals and said positive and negative output terminals, said bridge rectifier including at least one controlled rectifier in the signal path between said alternating-current source and said output terminals, means for controlling the conduction angle of said controlled rectifier responsive to the conditions across said output terminals, diodes connected from said third and fourth terminals to said output circuit, said diodes being poled to conduct current through said output terminals in the same direction as said bridge rectifier, an inductor having first and second portions with a common terminal, said first portion of said inductor connected in series between said bridge rectifier and one of said output terminals, said common terminal being connected to said bridge rectifier, and a diode and said second portion of said inductor being connected in series between said bridge rectifier and the other of said output terminals, said last-named diode poled to carry current to said positive output terminal.

References Cited by the Examiner

UNITED STATES PATENTS 2,777,107  1/57  Medlar _____ 321—27
3,061,768  10/62  De Ruiter _____ 321—40

LLOYD McCOLLUM, *Primary Examiner.*

ROBERT L. SIMS, *Examiner.*